F. WILTMANN.
APPARATUS FOR HOLDING ANIMALS WHILE STUNNING SAME.
APPLICATION FILED JUNE 19, 1912.
1,058,509.
Patented Apr. 8, 1913.
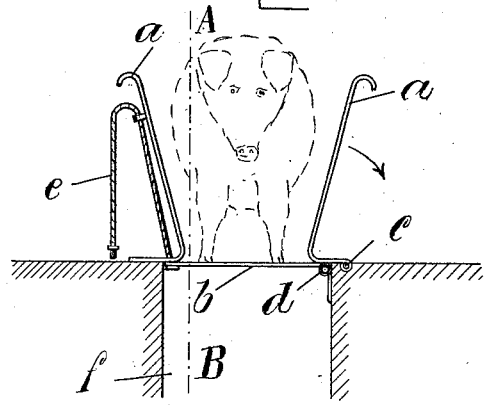
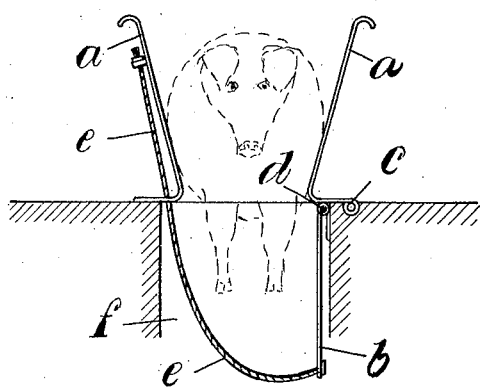
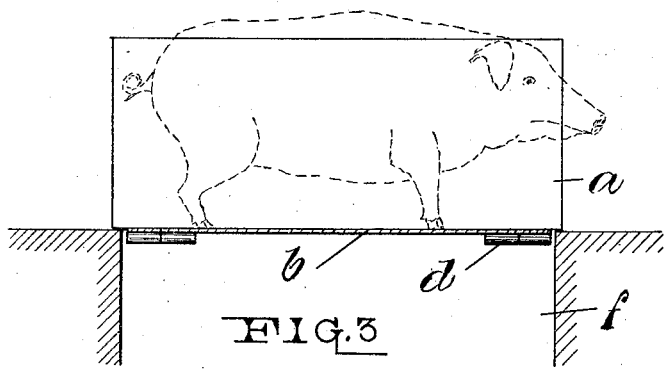
Witnesses:
Inventor:
Franz Wiltmann

UNITED STATES PATENT OFFICE.

FRANZ WILTMANN, OF PECKELOH, GERMANY.

APPARATUS FOR HOLDING ANIMALS WHILE STUNNING SAME.

1,058,509.   Specification of Letters Patent.   Patented Apr. 8, 1913.

Application filed June 19, 1912. Serial No. 704,591.

*To all whom it may concern:*

Be it known that I, FRANZ WILTMANN, a subject of the German Emperor, and resident of Peckeloh, Germany, have invented certain new and useful Improvements in Apparatus for Holding Animals While Stunning Same, of which the following is a specification.

This invention relates to an improved device for holding hogs and other animals for stunning same before killing them, which consists of a tray, which can be laterally turned over and which, in a way known in the art, is fitted with a hinged bottom, while the side walls of the tray are inclined and so far disposed from each other only that, when the hinged bottom is downwardly opened by means of a cord or the like and the animal falls down through the opening produced, it is clamped with its body between said inclined walls so that it is firmly held in the tray and can thus be easily stunned. Thereupon, the tray is laterally turned over and the animal can thus be withdrawn therefrom in order to be killed outside the same.

The accompanying drawing shows the improved apparatus.

Figure 1 is a front view thereof with closed bottom, Fig. 2 is a similar view with open bottom, and Fig. 3 a sectional side view, on the line A—B of Fig. 1, of the tray, a hog being shown in the apparatus by dotted lines.

$a$ is the tray which consists of two inclined side walls one of which can be laterally turned over on a hinge $c$ in the direction of the arrow shown in Fig. 1.

$b$ is the movable bottom, which turns on hinges $d$, a cord $e$ serving to operate said bottom.

The apparatus is mounted over a cavity $f$, which allows the bottom to be opened in downward direction.

The apparatus is used as follows:—First, the bottom must be closed which may be effected by pulling cord $e$. Then, the hog is driven into the tray through the open ends of same, and finally the cord is released whereby the bottom is opened by the weight of the animal. The hog is then firmly clamped between the inclined walls and can thus easily be stunned. Thereupon, one of the side walls of the tray is laterally turned over, so that the animal can be easily removed therefrom.

I claim:

Apparatus for holding hogs and other animals for stunning them, comprising in combination, a tray consisting of two inclined side walls one of which is hingedly mounted so as to be capable of being laterally turned over, a downwardly movable hinged bottom for said tray, and means to operate said bottom, the inclined side walls designed to clamp the body of an animal in the apparatus between them upon the bottom being opened, substantially as described and shown.

In testimony whereof I have hereunto set my hand in the presence of two subscribing witnesses.

FRANZ WILTMANN. [L. S.]

Witnesses:
 GUSTAV WILTMANN,
 HELEN NUFER.

Copies of this patent may be obtained for five cents each, by addressing the "Commissioner of Patents, Washington, D. C."